United States Patent

Naffziger et al.

[11] Patent Number: 5,757,686
[45] Date of Patent: May 26, 1998

[54] METHOD OF DECOUPLING THE HIGH ORDER PORTION OF THE ADDEND FROM THE MULTIPLY RESULT IN AN FMAC

[75] Inventors: Samuel D. Naffziger, Fort Collins, Colo.; David R. Smentek, Columbia, Md.

[73] Assignee: Hewlett-Packard Company, Palo Alto, Calif.

[21] Appl. No.: 566,415

[22] Filed: Nov. 30, 1995

[51] Int. Cl.[6] .................................................. G06F 7/38
[52] U.S. Cl. ............................................. 364/748.07
[58] Field of Search ........................ 364/748, 715.04, 364/748.07

[56] References Cited

U.S. PATENT DOCUMENTS 4,926,369  5/1990  Hokenek et al. ................ 364/748
4,969,118  11/1990  Montoye et al. ................ 364/748
5,375,078  12/1994  Hrusecky et al. ............... 364/748
5,530,663  6/1996  Garcia et al. ................... 364/748

OTHER PUBLICATIONS

IBM Journal of Research and Development, vol. 34, No. 1, Jan. 1990 (specifically, pp. 59–77).

*Primary Examiner*—Tan V. Mai

[57] ABSTRACT

A method and apparatus for decoupling the high order portion of the addend from the multiply result in an FMAC (floating-point multiply accumulate unit) such that the FMAC's datapath width is bounded to "2m+1"-bits, and the maximum width of required adders, shifters and leading bit anticipators is also bounded to "2m+1"-bits. The method and apparatus 1) reduce the necessary chip area for implementing an FMAC, and 2) reduce the length of routing paths through adders and shifters.

11 Claims, 7 Drawing Sheets

५,७५७,६८६

METHOD OF DECOUPLING THE HIGH ORDER PORTION OF THE ADDEND FROM THE MULTIPLY RESULT IN AN FMAC

BACKGROUND OF THE INVENTION

This invention pertains to a method and apparatus for decoupling the high order portion of the addend from the multiply result in an FMAC (floating-point multiply accumulate unit).

In the design of microprocessor architecture, three very important considerations are speed, accuracy and cost. While it is desirable to design a microprocessor (CPU) which performs multiplication, addition and other operations with superior accuracy and at a very high rate of speed, it is also desirable to design a CPU which can be cost effectively manufactured. Speed and accuracy have been greatly increased in RISC (reduced instruction set computer) CPUs by fusing multiply and add operations into the accumulate operation (A*B)+C. If it is desired to merely add or multiply two numbers, the operation A*B can be performed by setting C=0, and the operation A+C can be performed by setting B=1. The component of a CPU which performs the (A*B)+C operation is commonly referred to as an FMAC (floating-point multiply accumulate unit) or MAF/FPU (multiply-add-fused floating-point unit).

The inputs to an FMAC are the operands A (multiplicand), B (multiplier) and C (addend), where A, B and C may be fixed or floating-point numbers (floating-point numbers are numbers expressed in scientific notation). The IEEE conventions for representing single-(32-bit) and double-precision (64-bit) floating-point numbers in binary form is [S,E,M], where S is a single bit representing the sign of a number, E is an exponent, and M is a mantissa (stripped of its leading 1). Thus, the form of an IEEE floating-point number is $S*M*2^E$. In a single precision system, E is represented by eight bits, and M is represented by twenty-three bits (the twenty-three bit mantissa becomes a twenty-four bit mantissa when the floating-point number is input into an FMAC—operations performed internal to the FMAC require that a mantissa's implied leading 1 be present). In a double precision system, E is represented by eleven bits, and M is represented by fifty-two bits (fifty-three bits while the number is internal to the FMAC).

The physical layout of an FMAC is largely determined by the operations which need to be performed in adding and multiplying the mantissas of A, B and C. This is especially so when A, B and C are double-precision numbers and their mantissas (53-bits) are nearly five times the size of their exponents (11-bits). See FIG. 2 for the physical layout of a conventional FMAC 50.

The multiplication of A and B requires multiplication of their mantissas, and addition of their exponents. If the mantissa 22 of A comprises m-bits and the mantissa 24 of B comprises n-bits (where m and n each include the implied leading 1 of a mantissa), multiplication of their mantissas requires adding A to itself n-times, each time shifting the m-bits of A to the left by one bit. The result of the multiplication is an "m+n+1"-bit mantissa which requires an enlargement of the FMAC's datapath from m-bits to "m+n+1"-bits. If A and B are double precision numbers, each having an m-bit mantissa, the result of multiplying their mantissas is a 107-bit number ("2m+1"-bits). Thus, in a double precision system, the datapath of the FMAC pictured in FIG. 2 would need a multiply unit 26 allowing for a datapath expansion from 53- to 107-bits.

The addition of (A*B) and C requires alignment of their mantissas 28,30 through a comparison of the magnitude of their exponents, followed by addition of their mantissas. Four possible cases of addition must be accounted for:

1) EXP(C)<<EXP(A*B); (EXP=exponent)
2) EXP(C)<EXP(A*B)
3) EXP(C)>EXP(A*B)
4) EXP(C)>>EXP(A*B)

In the first case, an attempt to align the mantissas of (A*B) and C results in a right overshift of addend C, and thus C only influences the rounding of (A*B).

In the second case, alignment of the (A*B) and C mantissas results in shifting C to the right (see shifter 52 and SHIFTED_C 53 of FIG. 2). Some of the bits of C's mantissa may be overshifted, and will thus enter into rounding calculations (sticky bit information). The rest of C's bits will be added to the appropriate bits of the (A*B) result.

In the third and fourth cases, alignment of the (A*B) and C mantissas results in shifting C to the left. The left-shift requires that the datapath of a double precision FMAC be widened by another 53-bits (a total datapath width of "3m+1"-bits). Once C has been shifted out of the range of the (A*B) mantissa, the (A*B) result can only enter into the rounding of C, and there is no need to shift C further to the left. If the mantissas of (A*B) and C have any degree of overlap, the aligned bits of their mantissas are added (see adder 54 of FIG. 2).

Using a leading bit anticipator 56 and/or truncation, the accumulate output of an FMAC will be an "m−1"-bit mantissa 44 (the leading 1 is once again stripped), an exponent, and a sign bit (in the form S,E,M). Bits truncated from, or otherwise shifted out of (see shifter 58 of FIG. 2), the "m−1"-bit mantissa output may be used in rounding calculations.

It can be appreciated that a disadvantage of conventional FMACs is the physical space required by the "3m+1"-bit adder, shifters, and leading bit anticipator. It is difficult to make efficient use of the odd-shaped chip area bounded on the bottom by these components, and on one side by the slant of the multiply unit. Since chip area is valuable, any waste of space can be extremely costly.

Furthermore the routing requirements of large adders, shifters, and leading bit anticipators lead to increases in FMAC manufacturing costs, and decreases in system performance (slower operating speeds due to the greater distances over which signals must be routed).

It is therefore a primary object of this invention to provide an FMAC, and method for using same, which eliminate the need for expanding the FMAC's datapath to a width of "3m+1"-bits, thereby bounding the FMAC's datapath to a width of "2m+1"-bits.

It is another object of this invention to provide an FMAC, and method for using same, which only require the use of up to "2m+1"-bit adders, shifters, and leading bit anticipators.

It is also an object of this invention to provide an FMAC, and method for using same, which result in significant cost savings through the reduction in physical chip area required by the FMAC.

It is yet another object of this invention to provide an FMAC, and method for using same, which result in better system performance through the down-sizing of signal routing paths.

SUMMARY OF THE INVENTION

In the achievement of the foregoing objects, the inventors have devised a floating-point multiply accumulate unit for performing the accumulate operation (A*B)+C, wherein A, B, and C each comprise an m-bit mantissa and an exponent.

and the (A*B) result comprises a 2m+1-bit mantissa and an exponent. The FMAC first compares the exponents of (A*B) and C to determine whether there is an overlapping range of the (A*B) and C mantissas. Any part of the C mantissa which exceeds the range of the (A*B) mantissa is transferred to a CHI buffer. The remainder of C, or that part of the C mantissa which overlaps the range of the (A*B) mantissa, is shifted so as to align the bits of the (A*B) and C mantissas according to their respective magnitudes. Thereafter, the shifted part of the C mantissa is added to the (A*B) mantissa to generate a temporary result. If a portion of the C mantissa was transferred to the CHI buffer, one or more least significant bits (corresponding to a number of bits transferred to the CHI buffer) are shifted out of the temporary result. Finally, the bits of the C mantissa which were transferred to the CHI buffer are merged into one or more most significant bit positions of the temporary result to generate a merged result.

All of the above steps may be performed within the bounds of a "2m+1"-bit wide datapath. Thus, 1) the chip area required to implement the FMAC is reduced, 2) signal routing paths are shorter, 3) system performance (speed) is increased, 4) smaller and less expensive adders, shifters and leading bit anticipators may be used, and 5) significant cost savings result.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENTS

Figure 1:
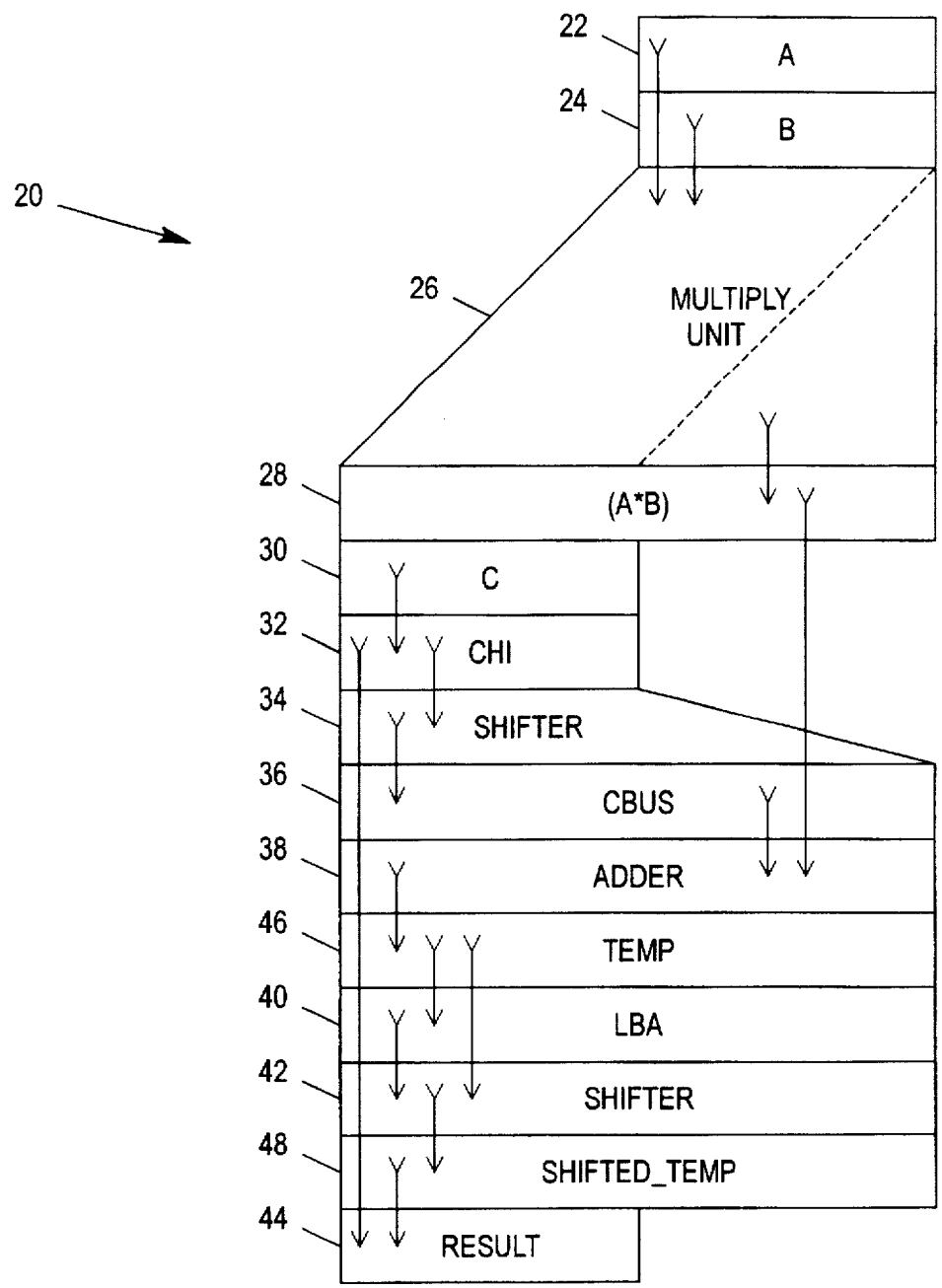
FIG. 1 is a schematic of an FMAC having a datapath width of "2m+1"-bits because the high order portion of the addend has been decoupled from the multiply result.
Figure 2:
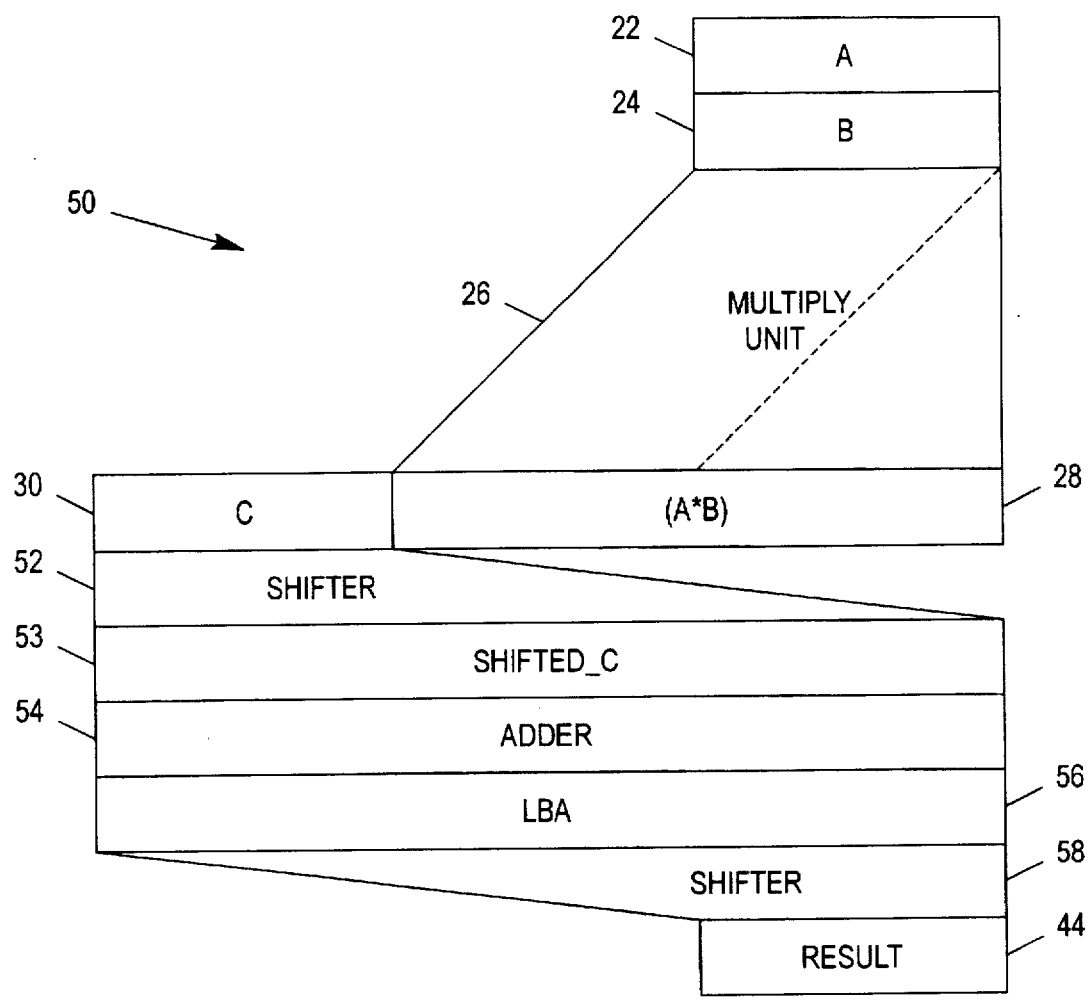
FIG. 2 is a schematic of a conventional FMAC having a datapath width of "3m+1"-bits.
Figure 3:
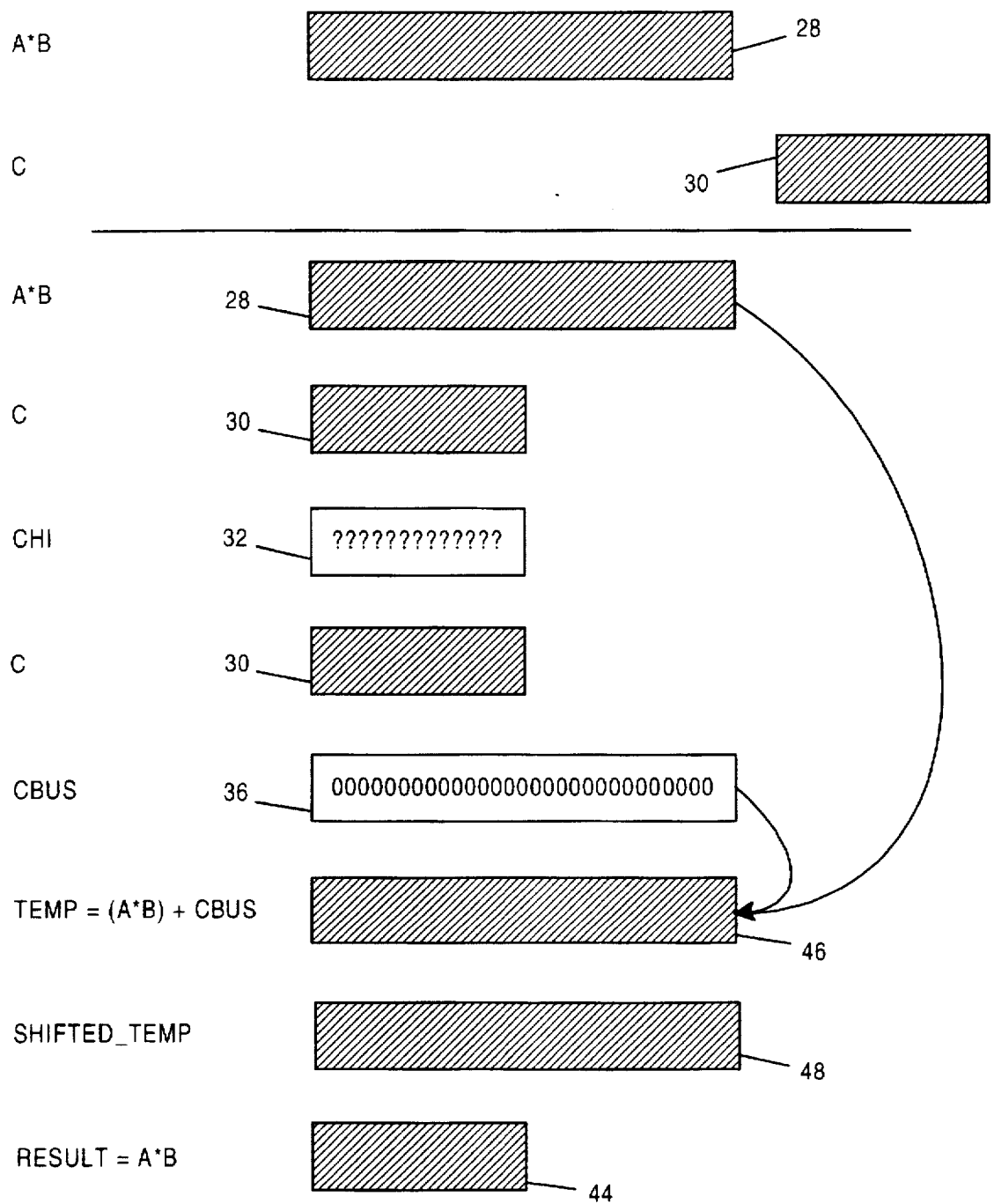
FIG. 3 shows the flow of data through the FMAC of FIG. 1 when EXP(C<<EXP(A*B)
Figure 4:
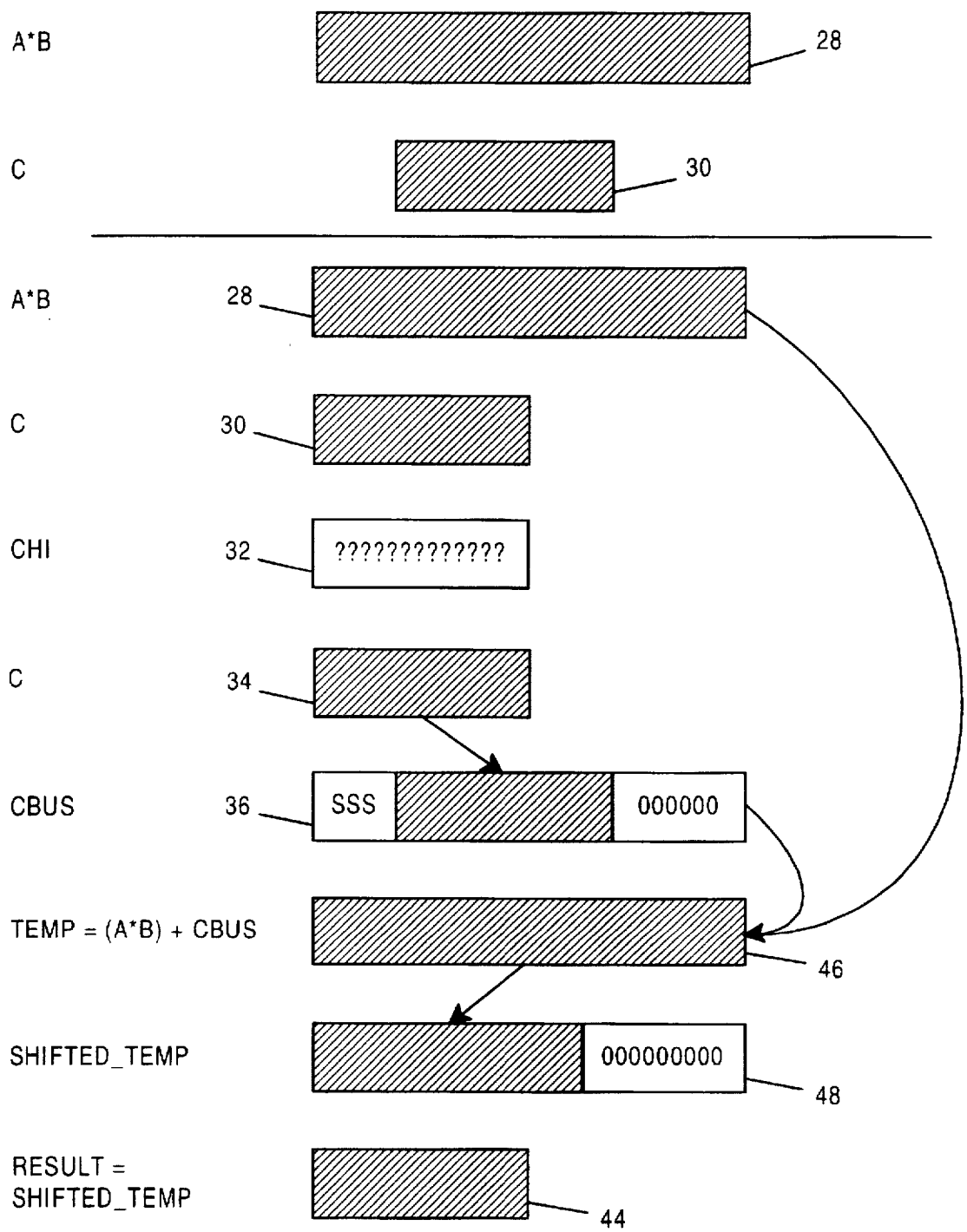
FIG. 4 shows the flow of data through the FMAC of FIG. 1 when EXP (C<EXP(A*B)
Figure 5:
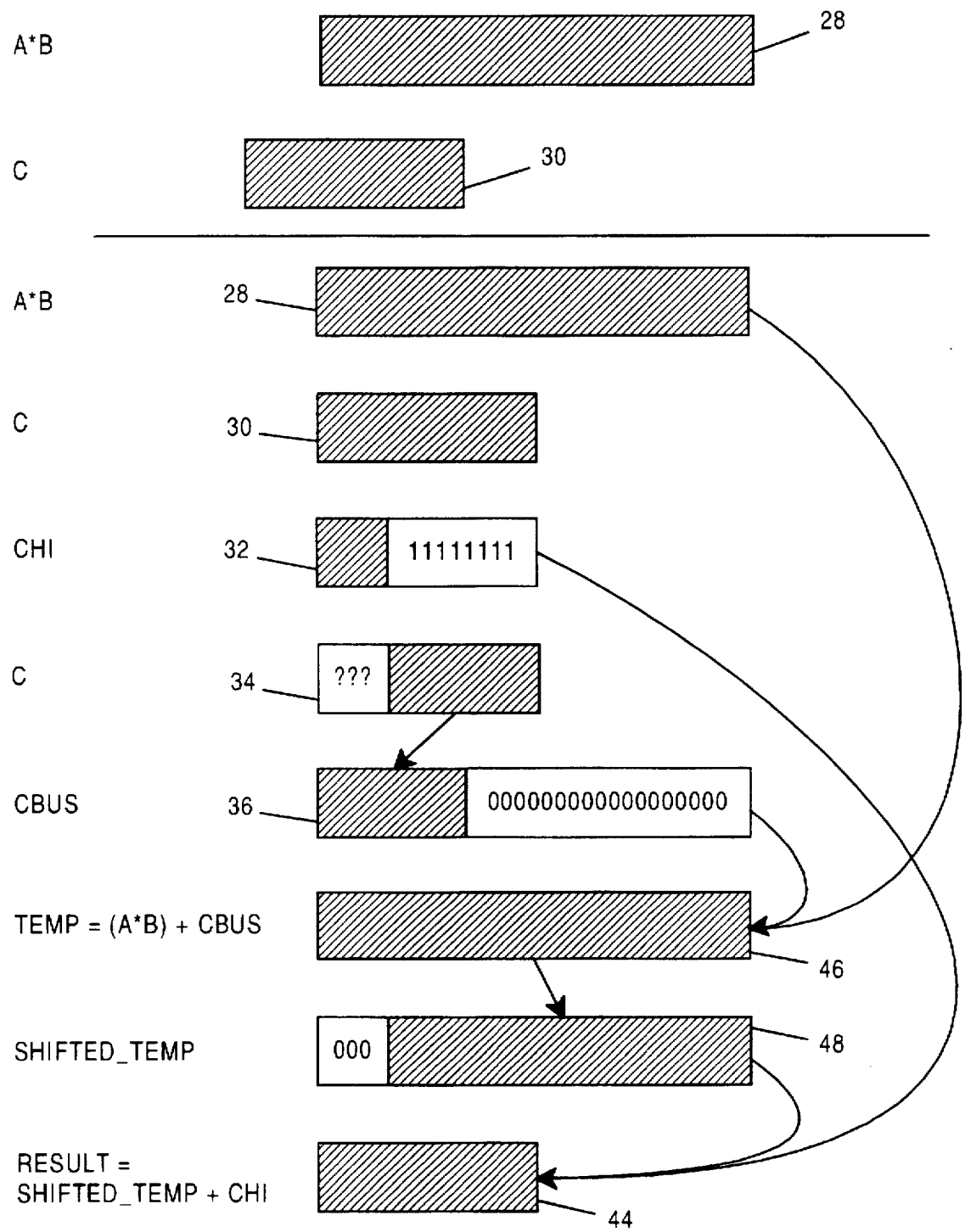
FIG. 5 shows the flow of data through the FMAC of FIG. 1 when EXP(C>EXP(A*B)
Figure 6:
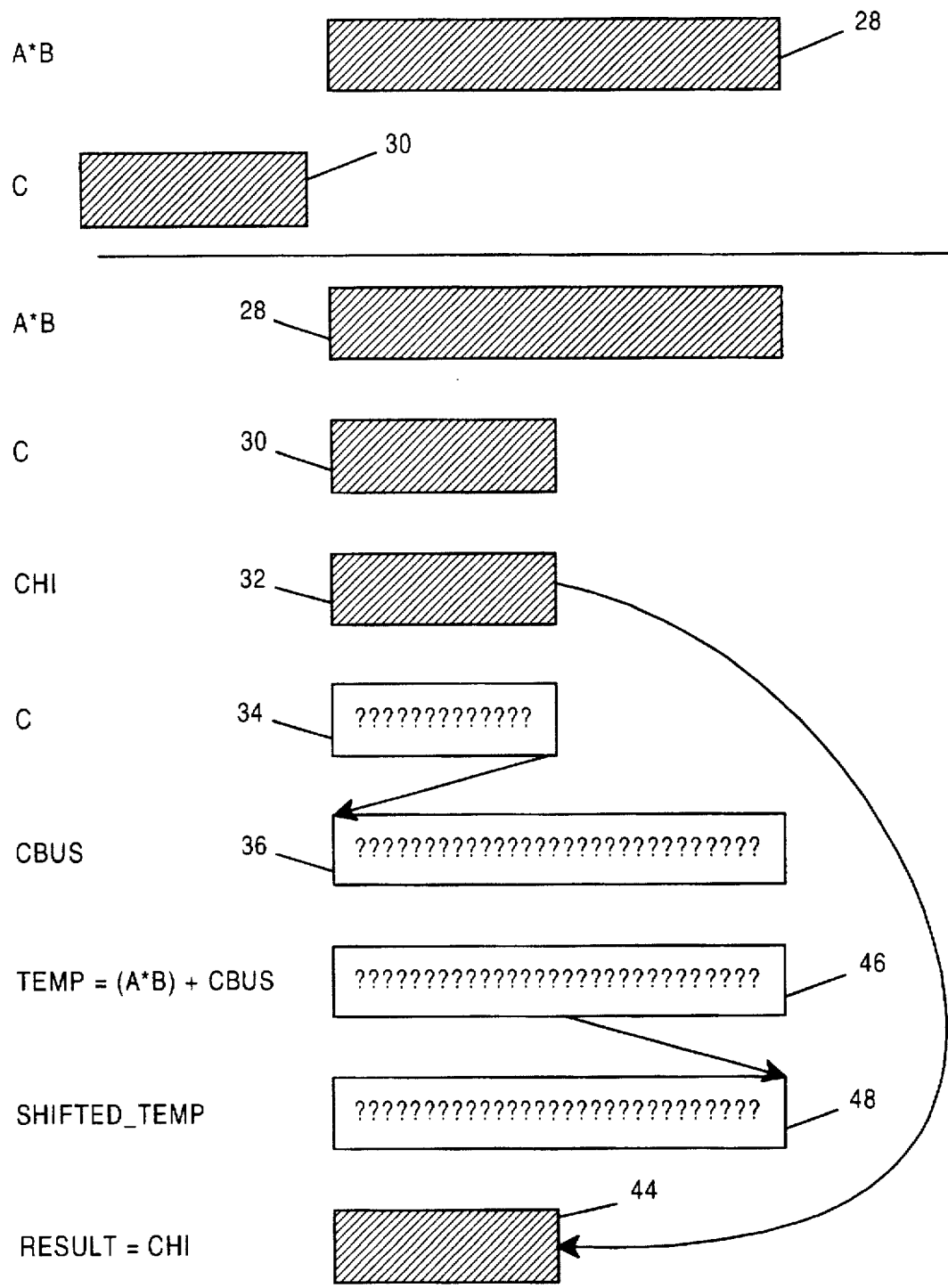
FIG. 6 shows the flow of data through the FMAC of FIG. 1 when EXP(C>>EXP(A*B)

A method of decoupling the high order portion of the addend from the multiply result 28 in an FMAC 20 (floating point multiply accumulate unit) performing the accumulate operation (A*B)+C, wherein A, B, and C 22, 24, 30 each comprise an m-bit mantissa and an exponent, and the (A*B) result 28 comprises a "2m+1"-bit mantissa and an exponent, is described in FIGS. 3–6. The method may generally comprise the steps of comparing the exponents of (A*B) 28 and C 30 to determine whether there is an overlapping range of the (A*B) 28 and C 30 mantissas; transferring any part of the C mantissa 30 which exceeds a range of the (A*B) mantissa 28 to a CHI register 32; shifting any part of the C mantissa 30 which overlaps the range of the (A*B) mantissa 28, so as to align the bits of the (A*B) 28 and C 30 mantissas according to their respective magnitudes; adding the shifted part 36 of the C mantissa 30 to the (A*B) mantissa 28 to generate a temporary result; if a portion of the C mantissa 30 was transferred to the CHI register 32, shifting one or more least significant bits corresponding to a number of bits transferred to the CHI register 32 out of the temporary result; and merging the bits of the C mantissa 30 which were transferred to the CHI register 32 with one or more most significant bit positions of the temporary result to generate an accumulate result 44. An FMAC 20 capable of implementing the above method is pictured in FIG. 1, and may generally comprise a CHI register 32, coupled to means for transferring bits of the C mantissa 30 which exceed a range of the (A*B) mantissa 28 to the CHI register 32; a CBUS register 36, coupled to a first shifter 34 for placing bits of the C mantissa 30 which overlap the range of the (A*B) mantissa 28 into the CBUS register 36, the overlapping bits contained within the (A*B) and CBUS registers 28, 36 being aligned for adding; an adder 38, coupled to the (A*B) and CBUS registers 28, 36, and providing an (A*B)+CBUS output 46; a leading bit anticipator 40 connected to the (A*B)+CBUS output 46 of the adder 38; a second shifter 42, coupled to the leading bit anticipator 40, and providing a temporary output 48; and means for merging those bits of the CHI register 32 comprising bits of the C mantissa 30 which exceed the range of the (A*B) mantissa 28 with one or more most significant bits of the temporary output 48 to produce an (A*B)+C accumulate output 44.

Having thus described the FMAC 20 and method of using same in general, they will now be described in further detail.

The preferred embodiment of the method begins with operands (A*B) 28 and C 30 of an FMAC 20, where (A*B) 28 is a multiply result having a "2m+1"-bit mantissa, and C 30 is an addend having an m-bit mantissa. Each operand 28, 30 is further associated with an exponent and a sign bit. Although the accumulate operation (A*B)+C is performed as an indivisible operation within an FMAC 20, the method of adding (A*B) 28 and C 30 by decoupling the high order portion of C 30 from the (A*B) result 28 is independent of the multiplication of A 22 and B 24, and consequently, all that needs to be known about the multiply unit 26 of the FMAC 20 is that it produces the "2m+1"-bit mantissa of the (A*B) multiply result 28 by multiplying the m-bit mantissas of operands A 22 and B 24 (the multiplicand and multiplier) using carry save adders or the like.

After an (A*B) result 28 is created, the magnitude of the (A*B) 28 and C 30 exponents are compared to determine which of four possible cases exists. The four cases are:

1) EXP(C)<<EXP(A*B); (EXP=exponent)
2) EXP(C)<EXP(A*B)
3) EXP(C)>EXP(A*B)
4) EXP(C)>>EXP(A*B)

These cases are respectively illustrated in FIGS. 3–6. In each of these figures, the mantissas 28, 30 pictured above the horizontal dividing line illustrate one of the above numbered cases, and the registers 28-32, 36, 44-48 pictured below the horizontal dividing line illustrate a preferred means of handling the case within the confines of a "2m+1"-bit datapath. Less than (<) and greater than (>) mean that although the exponents of (A*B) 28 and C 30 differ, there is some degree of overlap between the ranges of their mantissas. Much less than (<<) and much greater than (>>) mean that the difference between the exponents of (A*B) 28 and C 30 is great enough that the ranges of their mantissas do not overlap.

Case three (FIG. 5), wherein EXP(C)>EXP(A*B) will be considered first, as this is the case which is affected by the FMAC 20 and method for using same presented herein. Although the mantissa of C 30 is input into the FMAC 20 within the bounds of the FMAC's "2m+1"-bit wide datapath, a comparison of the exponents of (A*B) 28 and C 30 shows that some of the less significant bits of C 30 overlap some of the most significant bits of (A*B) 28. In a conventional FMAC 50, this case would require a "3m+1"-bit adder 54, shifters 52, 58, and leading bit anticipator 56, thus widening the required datapath of the FMAC 50 from "2m+1"-bits to "3m+1"-bits. However, datapath expansion may be eliminated by decoupling the high order portion of C 30, or that portion of C 30 which does not overlap the (A*B) result 28.

A number of bits of C 30 equal to the difference between the C 30 and (A*B) 28 exponents are transferred to corresponding positions of a CHI register 32. The remainder of the CHI 32 bit positions are filled with ones. Once the high order bits of C 30 have been transferred to CHI 32, it matters not what remains in the high order bit positions of C 30. The high order bit positions of C 30 are masked as the remaining contents of C 30 are transferred to a "2m+1"-bit CBUS register 36. As the contents of C 30 are transferred to CBUS 36, they are shifted left a number of bits corresponding to the difference of the C 30 and (A*B) 28 exponents. It can be seen that the high order portion of C 30 is masked from CBUS 36, and the overlapping bits of C 30 and (A*B) 28 are now aligned. The less significant bits of CBUS 36 are filled with zeros. Having aligned the overlapping portion of C 30 with the (A*B) result 28, a temporary (A*B)+CBUS result (TEMP 46 in FIG. 5) can be generated using a "2m+1"-bit wide adder 38. Sticky bit information may be used to round the TEMP result 46, and any carry out of TEMP 46 may be used to increment CHI 32. Note that since the less significant bits of CHI 32 are filled with ones, a carry from TEMP 46 will ripple through the less significant bits of CHI 32 into the bits of CHI 32 representing the high order portion of C 30.

After creating the TEMP result 46, the TEMP result 46 must be right-shifted via shifter 42 by a number of bits equal to the difference between the C 30 and (A*B) 28 exponents. As the bits of TEMP 46 are shifted right, the most significant bits of TEMP 46 are filled with zeros. The shifted TEMP register is pictured in FIG. 5 as SHIFTED_TEMP 48. The high order portion of C 30 contained in CHI 32, being aligned with the temporary (A*B)+C result of SHIFTED_TEMP 48, may now be merged with SHIFTED_TEMP 48 to achieve the desired "m-1"-bit mantissa result 44. The exponent and sign of the result are adjusted using conventional methods.

Case four (FIG. 6), wherein EXP(C)>>EXP(A*B) will be considered next. In case four, a comparison of the C 30 and (A*B) 28 exponents shows that the mantissas of C 30 and (A*B) 28 do not overlap. Consequently, all of the bits of C 30 will be transferred to CHI 32, and the output of the FMAC 20 will be equal to CHI 32, possibly rounded by ±1 LSB (least significant bit), depending on the rounding mode used, and a number's sign. The values of the CBUS 36, TEMP 46 and SHIFTED_TEMP 48 registers are irrelevant in relation to the resultant output of the FMAC 20. When the non-existent low order bits of C 30 are shifted into CBUS 36, an overshift will result in a meaningless CBUS 36 (a CBUS 36 possibly filled with zeros). As the temporary (A*B)+C result (TEMP register 46) is shifted, an overshift will result in garbage (possibly zeros) filling the SHIFTED_TEMP register 48. The bits which are shifted out of the TEMP register 46 can be used in calculating a sticky bit for rounding of the CHI result 44.

Cases one and two will now be considered. In case one (FIG. 3), wherein EXP(C)<<EXP(A*B), a comparison of the C 30 and (A*B) 28 exponents shows that the mantissas of C 30 and (A*B) 28 do not overlap. Since C 30 has a magnitude which is less than (A*B) 28, no bits of C 30 are shifted into CHI 32. Since C 30 is much less than (A*B) 28, CBUS 36 will be filled with zeros, and the result 44 of the FMAC 20 will be an output of (A*B), possibly rounded by ±1 LSB, again depending on the rounding mode used, and the number's sign.

In case two (FIG. 4), wherein EXP(C)<EXP(A*B), a comparison of the (A*B) 28 and C 30 exponents will show that some or all of C 30 overlaps (A*B) 28. Again, no portion of C 30 is shifted into CHI 32. C 30 will go through a right-shift as it is transferred into CBUS 36. Less significant bits of CBUS 36 will be filled with zeros, and more significant bits of CBUS 36 will be filled with sign extension bits (zeros if C 30 is positive, and ones if C 30 is negative). It is possible that one or more bits of C 30 will be shifted out of the CBUS 36 range. These bits may be used for rounding purposes. After the TEMP result 46 is calculated, a leading bit anticipator 40 and shifter 42 may shift the TEMP result 46 to the left in SHIFTED_TEMP 48.

An FMAC 20 capable of implementing the above method is shown in FIG. 1 (data flow is illustrated by arrows connecting various components and registers). Note that it differs from a conventional FMAC 50 in that its maximum datapath width is limited to "2m+1"-bits rather than "3m+1"-bits. The multiply unit 26 of the FIG. 1 FMAC 20 is similar to that of a conventional FMAC 50. However, the adder 38, leading bit anticipator 40 and shifters 34, 42 are not. Since the CBUS 36 only comprises that portion of C 30 which overlaps (A*B) 28, it can be limited to a width of "2m+1"-bits. As a result, the shifters 34, 42 which respectively precede the CBUS 36 and accumulate result 44 registers can also be limited to a width of "2m+1"-bits. Furthermore, the leading bit anticipator 40 can be limited to a width of "2m+1"-bits. So limiting the maximum width of the FMAC's datapath not only decreases the chip area which is required in constructing the FMAC 20, but also decreases routing distances. It takes more lengthy wires, and adds to a system's overall delay, when routing must enable a "2m+1"-bit shift of a register bit rather than a mere "2m+1"-bit shift.

Figure 7:
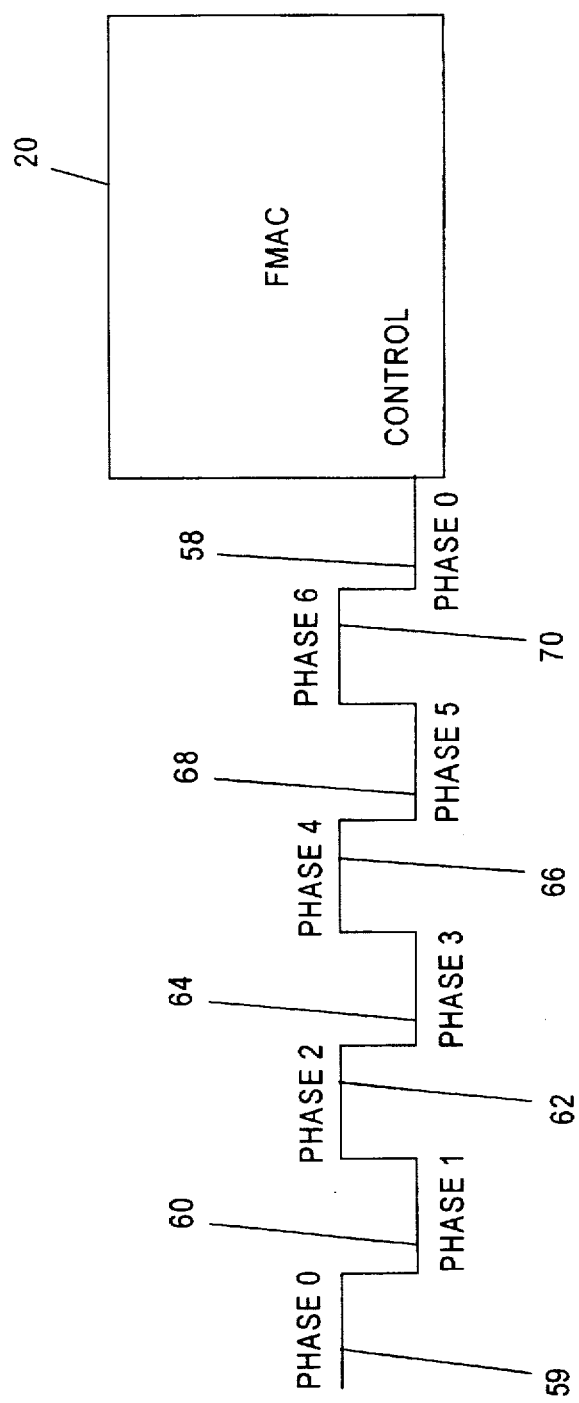
FIG. 7 shows a clock signal controlling the FMAC of FIG. 1.

As in a conventional FMAC 50, steps of the above method may be performed in parallel. A possible phasing scenario is depicted in FIG. 7. In clock phase zero 59, operands A, B, and C are input into the FMAC 20. In phase one 60, exponent operations (comparison, etc.) are carried out. In phase two 62, A and B are multiplied using the numerous carry save adders of the multiply unit 26. In phase three 64, the high order portion of C may be masked and transferred to CHI. Additionally, the partial products generated by the carry save adders are merged to create (A*B), and that portion of C which overlaps (A*B) is shifted so as to create a CBUS containing bits of C which are properly aligned with the (A*B) result. In phase four 66, (A*B) and CBUS are added in a "2m+1"-bit wide adder 38 to create a TEMP result. The TEMP result is fed into the leading bit anticipator 40, and major order shifts (shift 16's) are performed. Major order sticky information is determined and if necessary, the CHI register is incremented. In phase five 68, lower order shifts (shift 4's, shift 1's, and fixup shifts) are performed. The TEMP register is rounded according to the rounding mode, and CHI is incremented in response to any carry from the (A*B)+CBUS adder 38. If EXP(C)>(or >>) EXP(A*B), CHI is merged with the shifted TEMP register (SHIFTED_TEMP) to create the accumulate result (RESULT). Based on the post shift direction, the exponent associated with the (A*B) or C register is selected. If EXP(A*B) is selected (because of a post left shift), the exponent is adjusted by the amount of the post left shift. If EXP(C) is selected (because of a post right shift), the exponent may need adjustment by ±1. The RESULT register is output from the FMAC 20 in phase six 70, unless an underflow or overflow has occurred, in which case an exceptional mantissa is outputted (all 1's or all 0's).

It should be appreciated that the FMAC 20 and method for using same described above eliminate the need for increasing an FMAC's datapath width to a width greater than "2m+1"-bits, where "m" is the number of bits in the mantissa of an operand (including its leading 1). Adders, leading bit anticipators, and shifters which are reduced in width by one-third not only save physical chip area, but also reduce required lengths of routing wires—thereby allowing for increased operating speeds of these components.

While illustrative and presently preferred embodiments of the invention have been described in detail herein, it is to be understood that the inventive concepts may be otherwise variously embodied and employed and that the appended claims are intended to be construed to include such variations except insofar as limited by the prior art. The above description has been limited in scope to the flow of positive numbers through the FMAC. The inventors have conceived of the FMAC's use in conjunction with both positive and negative numbers, but believe that one skilled in the art (one knowing conventional techniques for working with signed numbers, such as converting a number to 2's compliment form, making bit inversions, etc.) will be fully capable of implementing the method described above using negative numbers.

What is claimed is:

1. A floating-point multiply accumulate unit (FMAC) for performing the accumulate operation (A*B)+C, wherein each of inputs A, B and C comprise a mantissa and an exponent, and wherein a multiply unit places an (A*B) mantissa in an (A*B) register, the unit comprising:

a) a CHI register, coupled to means for transferring bits of the C mantissa which exceed a range of the (A*B) mantissa to the CHI register;

b) a CBUS register, coupled to a first shifter for placing bits of the C mantissa which overlap the range of the (A*B) mantissa into the CBUS register, the overlapping bits of the mantissas contained within the (A*B) and CBUS registers being aligned for adding;

c) an adder, coupled to the (A*B) and CBUS registers, and providing an (A*B)+CBUS output;

d) a leading bit anticipator connected to the (A*B)+CBUS output of the adder;

e) a second shifter, coupled to the leading bit anticipator, and providing a temporary output; and f) means for merging those bits of the CHI register comprising bits of the C mantissa which exceed the range of the (A*B) mantissa with one or more most significant bits of the temporary output to produce an (A*B)+C accumulate output.

2. An FMAC as in claim 1, wherein:

a) the A×B mantissa comprises "2m+1"-bits;
   b) the (A*B)+CBUS output comprises "2m+1"-bits; and
   c) the adder has a maximum width of "2m+1"-bits.

3. An FMAC as in claim 2, wherein the first and second shifters have maximum widths of "2m+1"-bits.

4. An FMAC as in claim 3, wherein the leading bit anticipator has a maximum width of "2m+1"-bits.

5. An FMAC as in claim 4, wherein the FMAC has a mantissa datapath width of "2m+1"-bits.

6. In a floating-point multiply accumulate unit for performing the accumulate operation (A*B)+C, wherein A, B, and C each comprise an m-bit mantissa and an exponent, and an (A*B) result comprises a "2m+1"-bit mantissa and an exponent, a method of adding C to the (A*B) result, comprising the steps of:

a) comparing the exponents of (A*B) and C to determine whether there is an overlapping range of the (A*B) and C mantissas;

b) transferring any part of the C mantissa which exceeds a range of the (A*B) mantissa to a CHI register;

c) shifting any part of the C mantissa which overlaps the range of the (A*B) mantissa, so as to align the bits of the (A*B) and C mantissas according to their respective magnitudes;

d) adding the shifted part of the C mantissa to the (A*B) mantissa to generate a temporary result;

e) if a portion of the C mantissa was transferred to the CHI register, shifting one or more least significant bits corresponding to a number of bits transferred to the CHI register out of the temporary result; and f) merging the bits of the C mantissa which were transferred to the CHI register with one or more most significant bit positions of the temporary result to generate an accumulate result.

7. A method as in claim 6, wherein the temporary result comprises a "2m+1"-bit mantissa.

8. A method as in claim 7, further comprising the step of truncating the accumulate result so as to create an "m−1"-bit accumulate result.

9. A method as in claim 8, wherein the step of truncating the accumulate result is performed simultaneously with the step of merging the bits of the C mantissa which were transferred to the CHI register with one or more most significant bit positions of the temporary result to generate the accumulate result.

10. A method as in claim 6, further comprising the steps of:

a) filling less significant bits of the CHI register with ones; and b) if adding the shifted part of the C mantissa to the (A*B) mantissa generates a carry, incrementing the CHI register.

11. A method as in claim 10, further comprising the step of using any bits of C shifted out of the range of the (A*B) mantissa, and any bits shifted out of the temporary result, to round the merged result.

* * * * *